Sept. 22, 1936.　　　C. C. FARMER　　　2,055,121
FLUID PRESSURE BRAKE
Original Filed Oct. 8, 1931　　2 Sheets-Sheet 1

INVENTOR.
CLYDE C. FARMER
By *Wm. M. Cady*
ATTORNEY.

Sept. 22, 1936.  C. C. FARMER  2,055,121

FLUID PRESSURE BRAKE

Original Filed Oct. 8, 1931  2 Sheets-Sheet 2

INVENTOR.
CLYDE C. FARMER

By  *Wm. M. Cady*

ATTORNEY.

Patented Sept. 22, 1936

2,055,121

UNITED STATES PATENT OFFICE 2,055,121

FLUID PRESSURE BRAKE

Clyde C. Farmer, Pittsburgh, Pa., assignor to The Westinghouse Air Brake Company, Wilmerding, Pa., a corporation of Pennsylvania Application October 8, 1931, Serial No. 567,600
Renewed January 13, 1934

23 Claims. (Cl. 303—35)

This invention relates to fluid pressure brakes, and more particularly to an automatic fluid pressure brake system in which the brakes are applied by reducing the brake pipe pressure and are released when the brake pipe pressure is increased.

It is well known that when the usual brake valve device of a fluid pressure brake system on a train is turned to a brake application position, the brake pipe reduction resulting therefrom is first effective on the cars at the head end of the train and then on the cars at the rear end of the train, consequently the brakes are applied on the cars at the head end of the train, before and therefore with greater force than they are applied on the cars at the rear end. This braking action, particularly on long trains, is objectionable, in that the harsh running in of the train slack is permitted, which may cause excessive and damaging shocks.

The principal object of my invention is to provide improved means for delaying a brake application on the cars at the front end of a train, so that the brakes will apply at the front end of the train more nearly in synchronism with the application of the brakes at the rear end of the train.

Another object of my invention is to provide a brake controlling valve mechanism, such as a triple valve device, which when carried by a car near the head end of the train, is adapted to function to delay the brake application on the car when a reduction in brake pipe pressure is initiated.

Figure 1:
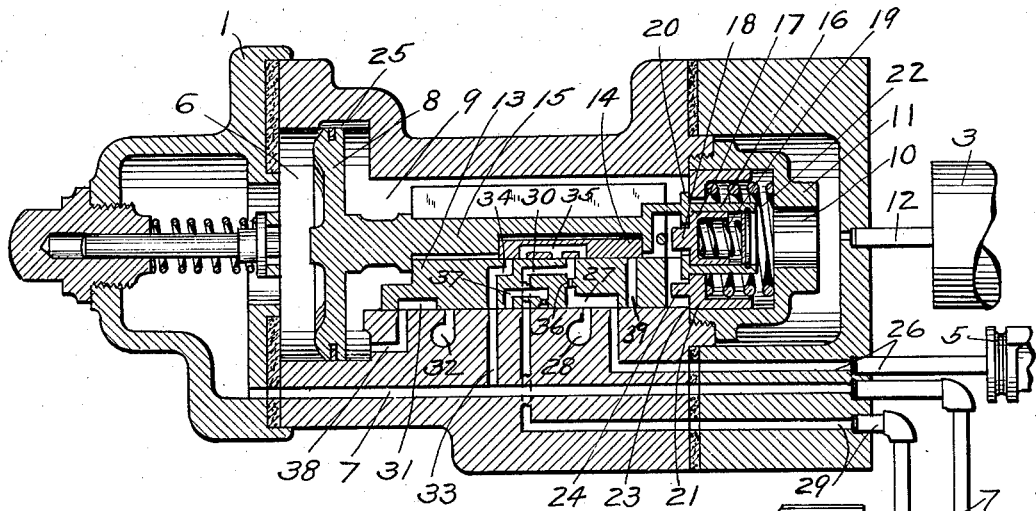
Figure 2:
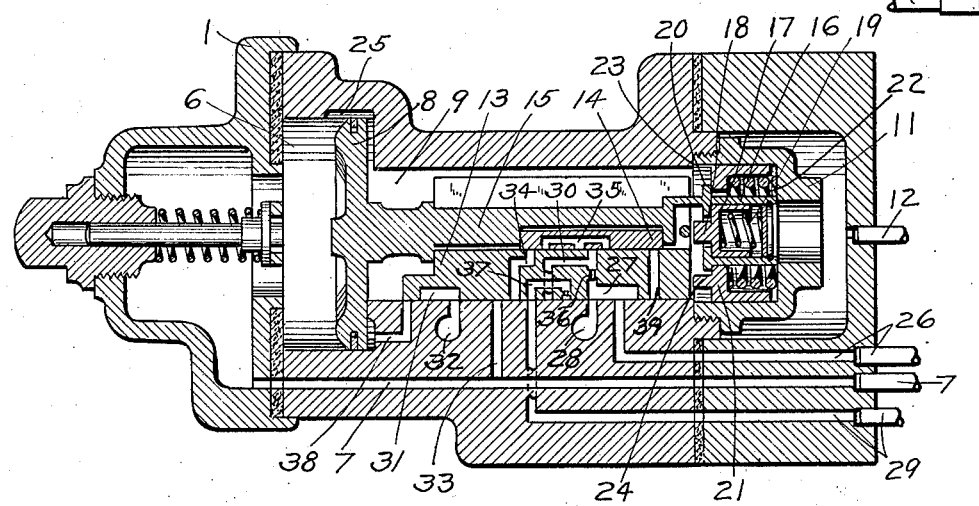
Figure 3:
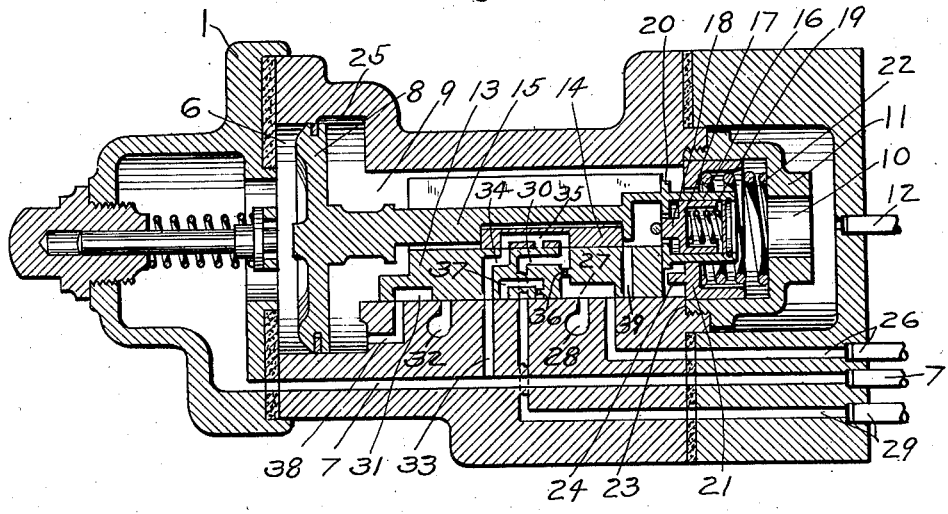
Figure 4:
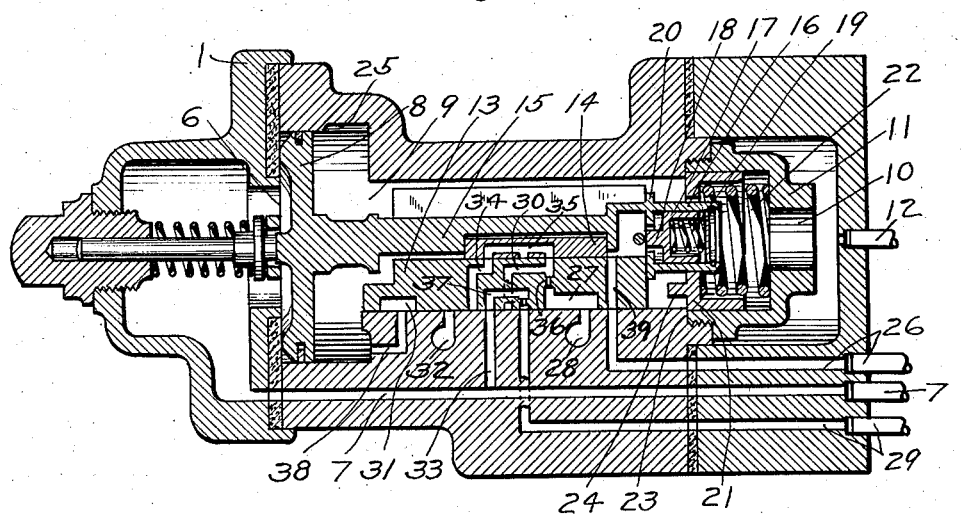

In the accompanying drawings, Fig. 1 is a diagrammatic view of a fluid pressure brake equipment including a triple valve device embodying my invention, the triple valve device being shown in section and the several parts thereof being shown in their outer or normal release position; Fig. 2 is a sectional view of the triple valve device showing the several parts thereof in an inner release position; Fig. 3 is a sectional view of the triple valve device showing the several parts in a preliminary quick service position and Fig. 4 is a sectional view of the triple valve device, showing the several parts in brake application position.

The fluid pressure brake equipment may comprise a triple valve device 1, a brake pipe 2, an auxiliary reservoir 3, a quick service chamber or reservoir 4, and a brake cylinder 5.

The triple valve device may comprise a casing having a piston chamber 6, connected by a passage and pipe 7 with the brake pipe 2, and containing a piston 8, and having a valve chamber 9, communicating through an opening 10 in a cap 11 having screw-threaded connection with the casing and through a pipe 12 with the auxiliary reservoir 3, and containing a main slide valve 13 and a graduating slide valve 14, mounted on and having a movement relative to the main slide valve. The slide valves 13 and 14 are operated by the piston 8 through the medium of a piston stem 15.

Carried at the rear end of the piston stem 15 is a cylindrical casing 16 in which is slidably mounted a stop member 17 having a forwardly projecting stem 18 adapted to engage the inner end of the main slide valve 13, said member being subject to the pressure of a coil spring 19 mounted in the casing 16.

The piston stem 15, adjacent its rear end, is provided with a lug 20 which, as shown in Figs. 1 and 2 is adapted to operatively engage a stop member 21 slidably mounted in the cap 11, said member being subject to the pressure of a spring 22 which is interposed between and engages the member and cap. Inward movement of the member 21 by the action of the spring 22 is adapted to be limited by a shoulder 23 formed interiorly of the casing. The member 21 is provided with a projection 24 which is adapted to engage with the main slide valve 13 at substantially the same time as the lug 20 engages with the member.

The lug 20 is adapted to engage the main slide valve 13 as shown in Figs. 3 and 4 for actuating the valve.

The triple valve piston 8 has an outer brake releasing position, as shown in Fig. 1, and an inner brake releasing position, as shown in Fig. 2, and may make full traverse in effecting a service application of the brakes.

In initially charging the equipment, the triple valve piston 8 moves inwardly toward release position, first shifting the graduating slide valve 14 relative to the main slide valve 13 and then moving both slide valves in unison. If the increase in brake pipe pressure is gradual, as is the case on the cars at the rear end of a train, the piston 8 and slide valves 13 and 14 move only to the outer release position, further inward movement being prevented by the engagement of lug 20 on the piston stem and of the main slide valve 13 with the stop member 21. When, however, the increase in brake pipe pressure is at a high rate, as is the case on the cars at the head end of the train, the piston 8 and slide valves are moved to the inner release position against the resistance of the spring pressed stop member 21.

With the several parts of the triple valve device in the outer release position, as shown in Fig. 1, fluid under pressure supplied, in the usual manner to the brake pipe 2, flows to the auxiliary reservoir 3 by way of pipe and passage 7, piston chamber 6, and feed groove 25 around the piston 8, valve chamber 9, passage 10 in the cap 11 and pipe 12. Further with the triple valve parts in this position, the brake cylinder 5 is open to the atmosphere through a pipe and passage 26, a cavity 27 in the slide valve 13 and an exhaust passage 28. The quick service reservoir 4 is also open to the atmosphere through a pipe and passage 29, a port 30 in the slide valve 13, a choked branch port 36, cavity 27 and passage 28.

With the triple valve parts in the inner release position, as shown in Fig. 2, the auxiliary reservoir is charged with fluid under pressure from the brake pipe and the brake cylinder is connected to the atmosphere in the same manner as when the parts are in the outer release position. The main slide valve in the inner release position closes the communication from the quick service reservoir 4 to the atmosphere.

In order to prevent the return movement of the triple valve parts to the outer release position, after the parts have been shifted to the inner position, a resistance increasing cavity 31 is provided in the main slide valve 13 which is open to the atmosphere through a passage 32.

With the cavity 31 thus open to the atmosphere, fluid under pressure in the valve chamber 9, acting on an area of the main slide valve 13 corresponding with the area of the cavity, creates a pressure to hold the main slide valve against movement from the inner release position, through the action of the spring pressed stop 21.

Before leaving a terminal, the brakes are applied and then released in order to test them. Upon reducing brake pipe pressure in the usual manner to effect an initial or test application of the brakes, the triple valve pistons 8 and consequently the slide valves 13 and 14 on the rear cars of the train move, in the usual manner from the outer release position, as shown in Fig. 1, toward application position, first shifting the graduating slide valve 14 relative to the main slide valve 13 to the position as shown in Fig. 3 and then shifting both slide valves to application position as shown in Fig. 4.

With the triple valve parts on the rear cars of the train in the position as shown in Fig. 3, the piston 8 closes the feed groove 25 and fluid under pressure is vented from the brake pipe 2 to the quick service reservoir 4 by way of pipe and passage 7, a branch passage 33, a port 34 in the main slide valve 13, a cavity 35 in the graduating slide valve 14, port 30 in the main slide valve 13, and passage and pipe 29. By thus venting fluid under pressure from the brake pipe to the reservoir 4, a sharp local reduction in brake pipe pressure is produced, which is effective on the local piston 8, and is rapidly transmitted to the next car toward the rear of the train, causing the triple valve device on said next car to act in a similar manner, and so on throughout the length of the rear portion of the train. As a consequence quick service action takes place on each car in advance of the application of the brakes on that car.

Following the above described quick service venting of fluid from the brake pipe, the triple valve piston 8 and main slide valve 13 are positively moved to application position on each car, in which position, as shown in Fig. 4, a port 39, in the main slide valve 13, which has been uncovered by the graduating slide valve 14 in its initial movement toward application position, registers with the passage 26 leading to the brake cylinder 5, so that fluid under pressure is supplied from the auxiliary reservoir 3 to the brake cylinder to effect an application of the brakes.

With the slide valves 13 and 14 in service position, fluid under pressure flows from the brake pipe to the quick service reservoir 4, through the pipe and passage 7, passage 33, a choked port 37 in the main slide valve 13 and passage and pipe 29. By thus venting fluid under pressure from the brake pipe, surges which may be caused in the fluid in the brake pipe will be effectively dampened so that they will be ineffective to move the triple valve piston from application position.

It will be noted that when the triple valve parts are in quick service position, as shown in Fig. 3, the port 30 in the main slide valve 13 is open to the atmosphere through the choked branch port 36, cavity 27 and passage 28, but due to the restriction offered by the choked branch passage and to the fact that the main slide valve 13 is quickly moved to service position, no appreciable reduction in brake pipe pressure is effected through this atmospheric connection.

Upon initiating the reduction in brake pipe pressure, the triple valve pistons on the front cars of the train move outwardly to the outer release position, shifting the graduating slide valve 14 relative to the main slide valve 13 until such time as the outward movement is stopped by the engagement of the piston stem lug 20 with the rear end of the main slide valve. The triple valve parts will now remain stationary until the brake pipe pressure in piston chamber 6, acting on one side of the piston 8, is reduced sufficiently that the pressure of fluid in the valve chamber 9 acting on the other side of the piston, together with the pressure of the spring 22 transmitted to the main slide valve 13, through the medium of the member 21, overcomes the resistance of the slide valve 13 to forward movement. When the resistance of the slide valve is overcome, the triple valve parts move toward application position. At substantially the time the main slide valve reaches quick service position, as shown in Fig. 1, the member 21 engages and stops against the shoulder 23 so that the spring 22 can no longer exert outward pressure on the piston stem. However, as the slide valve moves to quick service position, fluid under pressure flows from the valve chamber 9 to the resistance increasing cavity 31 by way of a passage 38, thus decreasing the resistance of the main slide valve to forward movement. With the main slide valve thus unloaded, the piston 8 moves to application position shifting the slide valves 13 and 14 quickly through quick service position, the movement being so fast that no appreciable reduction in brake pipe pressure will be effected, so that on the cars at the head end of the train there will be no propagation of quick service activity.

With the main slide valve in application position fluid under pressure flows from the auxiliary reservoir to the brake cylinder in the same manner as described in connection with the application of the brakes on the rear cars of the train. Further with the slide valve 13 in this position fluid under pressure flows from the brake pipe 2, to the quick service reservoir 4 by way of pipe and passage 7, passage 33, choked passage 37 in the main slide valve 13 and passage and pipe 29.

To release the brakes, the brake pipe pressure is increased in the usual manner causing several parts of the triple valves on the cars at the head end of the train to move to the inner release position and the triple valve parts on the cars at the rear end of the train to move to the outer release position as before described in connection with the initial charging of the equipment, thus releasing the brakes. On the cars at the rear end of the train the quick service reservoirs 4 are open to the atmosphere as before described in connection with the initial charging of the equipment, permitting fluid under pressure to flow from the reservoir to the atmosphere. On the cars at the head end of the train the fluid under pressure in the quick service reservoirs 4 is bottled up, but this is of no consequence since no quick service action is necessary on these cars.

It will be evident from the foregoing description that according to my invention, the movement of the several parts of the triple valve devices to a brake applying position on the cars at the head end of the train will be retarded by the increased frictional resistance offered by the main slide valve, while the movement of the corresponding parts of the triple valve devices on the cars at the rear end of the train will not be so retarded and as a result, the brakes on the cars at the head end of the train will not apply before those on the rear cars of the train.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, of a brake controlling valve device operated upon a reduction in brake pipe pressure to supply fluid under pressure for effecting an application of the brakes and upon an increase in brake pipe pressure for effecting the release of the brakes, a valve included in said valve device having two release positions, means operative in one position of said valve for increasing the resistance of the valve to movement, and means operative according to the rate of increase in brake pipe pressure on said valve device for positioning said valve to offer a greater or lesser resistance to movement upon a reduction in brake pipe pressure.

2. In a fluid pressure brake, the combination with a brake pipe, of a triple valve device operated upon a reduction in brake pipe pressure to supply fluid under pressure for effecting an application of the brakes and upon an increase in brake pipe pressure for effecting the release of the brakes, and means included in the triple valve device operative according to the rate of increase in the brake pipe pressure for conditioning the triple valve device to offer a greater or lesser resistance to movement upon a reduction in brake pipe pressure.

3. In a fluid pressure brake, the combination with a brake pipe, of a triple valve device comprising a valve mechanism operative upon a reduction in brake pipe pressure to effect an application of the brakes and operative upon an increase in brake pipe pressure to one or another of two positions for releasing the brakes, the positioning of said valve mechanism being according to the rate of increase in brake pipe pressure, and means operative according to the position of said valve mechanism for conditioning the valve mechanism to offer a greater or lesser resistance to movement upon a reduction in brake pipe pressure.

4. In a fluid pressure brake, the combination with a brake pipe, of a triple valve device comprising a valve having a brake applying position, an outer brake releasing position and an inner position, a piston included in said triple valve device operable upon an increase in brake pipe pressure to shift said valve to said outer release position and operable upon an increase in brake pipe pressure at a faster rate to shift the valve to said inner position and operable upon a reduction in brake pipe pressure for shifting said valve from either of said positions to said brake applying position, and means included in the triple valve device operable to retard the movement of said valve as the valve is shifted from said inner position toward said brake applying position.

5. In a fluid pressure brake, the combination with a brake pipe, of a triple valve device comprising a valve having a brake applying position, an outer brake releasing position and an inner position, a piston included in said triple valve device operable upon an increase in brake pipe pressure to shift said valve to said outer release position and operable upon an increase in brake pipe pressure at a faster rate to shift the valve to said inner position and operable upon a reduction in brake pipe pressure for shifting said valve from either of said positions to said brake applying position, and means included in the triple valve device operable to retard the movement of said valve as the valve is shifted from said inner position toward said brake applying position, said means being ineffective to retard the movement of said valve when the valve is shifted from said outer release position toward said brake applying position.

6. In a fluid pressure brake, the combination with a brake pipe, of a triple valve device comprising a valve having a brake applying position, an outer brake releasing position and an inner position, a piston included in said triple valve device operable upon an increase in brake pipe pressure to shift said valve to said outer release position and operable upon an increase in brake pipe pressure at a faster rate to shift the valve to said inner position and operable upon a reduction in brake pipe pressure for shifting said valve from either of said positions to said brake applying position, yielding resistance means for opposing movement of said valve from said outer brake releasing position to said inner position, and means included in the triple valve device and operable to retard the movement of said valve as the valve is being shifted from said inner position toward said brake applying position by the action of said spring and by the action of said piston upon the effecting of a reduction in brake pipe pressure.

7. In a fluid pressure brake, the combination with a brake pipe, of a triple valve device comprising a valve having a brake applying position, an outer brake releasing position and an inner position, a piston included in said triple valve device operable upon an increase in brake pipe pressure to shift said valve to said outer release position and operable upon an increase in brake pipe pressure at a faster rate to shift the valve to said inner position and operable upon a reduction in brake pipe pressure for shifting said valve from either of said positions to said brake applying position, and means included in the triple valve device operable to maintain the valve in its inner position and to retard the movement of said valve as the valve is shifted from said inner position toward said brake applying position.

8. In a fluid pressure brake, the combination with a brake pipe, of a triple valve device comprising a valve having a brake applying position, an outer brake releasing position and an inner position, a piston included in said triple valve device operable upon an increase in brake pipe pressure to shift said valve to said outer release position, and operable upon an increase in brake pipe pressure at a faster rate to shift the valve to said inner position, and operable upon a reduction in brake pipe pressure for shifting said valve from either of said positions to said brake applying position, yielding resistance means for opposing movement of said valve from said outer brake releasing position to said inner position, and means included in the triple valve device and operable to maintain the valve in its inner position against the pressure of said spring and to retard the movement of the valve as the valve is being shifted from said inner position toward said brake applying position by the action of said spring and by the action of said valve upon the effecting of a reduction in brake pipe pressure.

9. A triple valve device comprising a piston, a valve operated by said piston and having a brake applying position, an outer brake releasing position and an inner position, and a resistance increasing cavity in said valve which is connected to the atmosphere in said inner position and which is maintained at substantially atmospheric pressure when said valve is moved by said piston, in effecting an application of the brakes, from said inner position to said outer brake releasing position for causing said valve to resist movement from the inner position.

10. A triple valve device comprising a piston, a valve operated by said piston and having a brake applying position, an outer brake releasing position and an inner position, and a resistance increasing cavity in said valve which is connected to the atmosphere in said inner position and which is maintained at substantially atmospheric pressure when said valve is moved by said piston, in effecting an application of the brakes, from said inner position to said outer brake releasing position for causing said valve to resist movement from the inner position and thereby delaying the movement of the valve to its brake applying position.

11. In a fluid pressure brake, the combination with a brake pipe, of a triple valve device having means operable to a brake applying position upon effecting a reduction in brake pipe pressure and operable to an outer brake releasing position upon an increase in brake pipe pressure and to an inner brake releasing position upon an increase in brake pipe pressure at a faster rate, and means included in the triple valve device operable to delay the movement of the first mentioned means when the first mentioned means is being moved from said inner position toward said brake applying position in effecting an application of the brakes.

12. In a fluid pressure brake, the combination with a brake pipe, of a triple valve device having means operable to a brake applying position upon effecting a reduction in brake pipe pressure and operable to an outer brake releasing position upon an increase in brake pipe pressure and to an inner brake releasing position upon an increase in brake pipe pressure at a faster rate, and means included in the triple valve device operable to delay the movement of the first mentioned means toward the brake applying position until the first mentioned means are in said outer brake releasing position when the first mentioned means are moved from said inner position in effecting an application of the brakes.

13. In a fluid pressure brake, the combination with a brake pipe, a brake cylinder, an auxiliary reservoir, a triple valve device comprising a piston subject to the opposing pressures of the auxiliary reservoir and brake pipe, and valve means operated by said piston upon a reduction in brake pipe pressure for supplying fluid to the brake cylinder, said piston and valve means being movable to one or the other of two positions according to the variations in the differential of pressures between the brake pipe and auxiliary reservoir, of means included in the triple valve device for retarding the action of said valve means to supply fluid to the brake cylinder, said means being rendered either effective or ineffective according to which of said positions said piston and valve means are in when a reduction in brake pipe pressure is effected.

14. In a fluid pressure brake, the combination with a brake pipe, a reservoir and a triple valve device comprising valve means having a brake applying position, an outer brake releasing position and an inner brake releasing position, of means operative upon movement of said valve means toward brake applying position for venting fluid under pressure from the brake pipe to said reservoir, means operative when said valve means is in brake applying position for venting fluid under pressure from the brake pipe to said reservoir, and means operative upon movement of the valve means to the outer release position for venting fluid under pressure from said reservoir, said valve means when operated to said inner position rendering the last mentioned means ineffective to vent fluid from said reservoirs and to bottle up the fluid in said chamber.

15. In a fluid pressure brake, the combination with a brake pipe, a reservoir and a triple valve device comprising valve means having a brake applying position, an outer brake releasing position and an inner brake releasing position, of means operative upon movement of said valve means toward brake applying position for venting fluid under pressure from the brake pipe to said reservoir at a relatively fast rate, means operative when said valve means is in brake applying position for venting fluid under pressure from the brake pipe to said reservoir at a relatively slow rate, and means operative upon movement of the valve means to the outer release position for venting fluid under pressure from said reservoir, said valve means when operated from brake applying position to said inner position rendering the last mentioned means ineffective to vent fluid under pressure from said reservoir.

16. In a fluid pressure brake, the combination with a brake pipe, of a brake controlling valve device operated upon a reduction in brake pipe pressure for supplying fluid under pressure to effect an application of the brakes and movable according to the rate of increase in brake pipe pressure either to a normal release position or an inner release position, means operable upon movement of said valve device from its normal release position upon a reduction in brake pipe pressure for venting fluid from the brake pipe to effect a local reduction in brake pipe pressure, and means operable to substantially prevent the venting of fluid from the brake pipe upon movement of said valve device from its inner release position under a reduction in brake pipe pressure.

17. In a fluid pressure brake, the combination with a brake pipe, of a brake controlling valve device comprising a valve mechanism operated upon a reduction in brake pipe pressure for supplying fluid under pressure to effect an application of the brakes and movable according to the rate of increase in brake pipe pressure either to a normal release position or an inner release position, means included in said valve mechanism operable upon movement of the valve mechanism from its normal release position upon a reduction in brake pipe pressure for venting fluid from the brake pipe to effect a local reduction in brake pipe pressure, and means for controlling the operation of said mechanism to render the first mentioned means substantially ineffective to vent fluid under pressure from the brake pipe when the valve mechanism is moved from its inner release position under a reduction in brake pipe pressure.

18. In a fluid pressure brake, the combination with a brake pipe, of a brake controlling valve device comprising a valve mechanism operated upon a reduction in brake pipe pressure for supplying fluid under pressure to effect an application of the brakes and movable according to the rate of increase in brake pipe pressure either to a normal release position or an inner release position, means included in said valve mechanism operable upon movement of the valve mechanism from its normal release position upon a reduction in brake pipe pressure for venting fluid from the brake pipe to effect a local reduction in brake pipe pressure, and means operative to cause the valve mechanism to move quickly through the normal release position to render the first mentioned means substantially ineffective to vent fluid under pressure from the brake pipe when the valve mechanism is moved from its inner release position under a reduction in brake pipe pressure.

19. In a fluid pressure brake, the combination with a brake pipe, of a brake cylinder, a brake controlling valve mechanism operative upon a reduction in brake pipe pressure to supply fluid under pressure to the brake cylinder to effect an application of the brakes and operative upon an increase in brake pipe pressure to either one of two release positions to release fluid under pressure from the brake cylinder, and means included in said mechanism and operative when the mechanism is moved from one of said release positions upon a reduction in brake pipe pressure to vent fluid under pressure from the brake pipe, said means being rendered substantially ineffective to vent fluid under pressure from the brake pipe when the mechanism is moved from the other of said release positions upon a reduction in brake pipe pressure.

20. In a fluid pressure brake, the combination with a brake pipe, of a brake cylinder, a brake controlling valve mechanism operative upon a reduction in brake pipe pressure to supply fluid under pressure to the brake cylinder to effect an application of the brakes and operative upon an increase in brake pipe pressure to either one of two release positions to release fluid under pressure from the brake cylinder, means included in said mechanism and operative when the mechanism is moved from one of said release positions upon a reduction in brake pipe pressure to vent fluid under pressure from the brake pipe, and means operative to substantially prevent the venting of fluid from the brake pipe when the mechanism is moved from the other of said release positions upon a reduction in brake pipe pressure.

21. In a fluid pressure brake, in combination, a brake pipe, a brake controlling valve device operative upon a reduction in brake pipe pressure to effect an application of the brakes and operated upon an increase in brake pipe pressure to either one of two positions to effect a release of the brakes, the positioning of the device in releasing the brakes being dependent upon the rate of increase in brake pipe pressure, and means for varying the resistance of the device to movement toward application position according to the release position to which the device has been moved.

22. The combination of claim 21 further characterized in that the means for varying the resistance of the device comprises a slide valve and means included in the slide valve for increasing or decreasing the frictional resistance of the device to movement toward application position.

23. The combination of claim 21 further characterized in that the means for varying the resistance of the device comprises a slide valve having a cavity which in one position of the brake controlling valve device is connected to the atmosphere to effect an increase in the resistance of the device to movement, and which in another position of the brake controlling valve device is supplied with fluid under pressure to effect a decrease in the resistance of the device to movement.

CLYDE C. FARMER.